US010854912B2

(12) United States Patent
Sung et al.

(10) Patent No.: US 10,854,912 B2
(45) Date of Patent: Dec. 1, 2020

(54) SULFIDE-BASED SOLID ELECTROLYTE AND ALL-SOLID-STATE BATTERY APPLIED THEREWITH

(71) Applicant: LG CHEM, LTD., Seoul (KR)

(72) Inventors: Da Young Sung, Daejeon (KR); Chan Yeup Chung, Daejeon (KR); Su Hwan Kim, Daejeon (KR); Jong Hyun Chae, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 15/763,752

(22) PCT Filed: Jan. 12, 2017

(86) PCT No.: PCT/KR2017/000429
§ 371 (c)(1),
(2) Date: Mar. 27, 2018

(87) PCT Pub. No.: WO2017/123026
PCT Pub. Date: Jul. 20, 2017

(65) Prior Publication Data
US 2019/0051931 A1    Feb. 14, 2019

(30) Foreign Application Priority Data

Jan. 12, 2016  (KR) .................. 10-2016-0003514
Jan. 12, 2017  (KR) .................. 10-2017-0005605

(51) Int. Cl.
*H01M 10/0562*    (2010.01)
*H01M 10/052*    (2010.01)
(Continued)

(52) U.S. Cl.
CPC ......... *H01M 10/0562* (2013.01); *C01B 17/22* (2013.01); *C01G 19/006* (2013.01);
(Continued)

(58) Field of Classification Search
CPC ...... H01M 10/052–0525; H01M 10/056–0562
See application file for complete search history.

(56) References Cited

U.S. PATENT DOCUMENTS

2011/0274984 A1  11/2011  Hama et al.
2012/0328958 A1  12/2012  Jeong et al.
(Continued)

FOREIGN PATENT DOCUMENTS

CN    102823049 A    12/2012
CN    103730630 A    4/2014
(Continued)

OTHER PUBLICATIONS

Aono et al., "Electrical property and sinterablity of $LiTi_2(PO_4)_3$ mixed with lithium salt ($Li_3PO_4$ or $Li_3BO_3$)", Solid State Ionics, vol. 47, 1991, pp. 257-264.
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

The present invention relates to a solid electrolyte comprising a sulfide-based compound and an all-solid-state battery applied therewith and, more particularly, to a solid electrolyte comprising a sulfide-based compound that is free of phosphorus (P) element but exhibits high ionic conductivity, and an all-solid-state battery applied therewith. The sulfide-based solid electrolyte and the all-solid-state battery applied therewith according to the present invention exhibit improved reactivity to moisture to prevent the generation of toxic gas, resulting in an improvement in safety and stability and do not reduce in ion conductivity even after being left in air, and the solid electrolyte is easy to handle and store thanks to the improved shelf stability thereof.

6 Claims, 3 Drawing Sheets

(51) Int. Cl.
*H01M 10/0525* (2010.01)
*C01G 19/00* (2006.01)
*C01B 17/22* (2006.01)
*C01G 35/00* (2006.01)
*C01G 25/00* (2006.01)

(52) U.S. Cl.
CPC ......... *C01G 25/006* (2013.01); *C01G 35/006* (2013.01); *H01M 10/052* (2013.01); *H01M 10/0525* (2013.01); *C01P 2002/72* (2013.01); *C01P 2004/61* (2013.01); *C01P 2004/62* (2013.01); *H01M 2300/0068* (2013.01)

(56) References Cited

U.S. PATENT DOCUMENTS

| | | |
|---|---|---|
| 2013/0040208 A1 | 2/2013 | Kanno et al. |
| 2015/0017548 A1 | 1/2015 | Kato et al. |
| 2015/0171463 A1 | 6/2015 | Liang et al. |
| 2015/0214572 A1 | 7/2015 | Kato et al. |
| 2015/0270571 A1 | 9/2015 | Kambara et al. |
| 2015/0333376 A1 | 11/2015 | Gaben |
| 2015/0357644 A1 | 12/2015 | Holme et al. |
| 2016/0172706 A1 | 6/2016 | Xiao et al. |

FOREIGN PATENT DOCUMENTS

| | | | |
|---|---|---|---|
| CN | 104752759 A | 7/2015 | |
| CN | 104904039 A | 9/2015 | |
| CN | 105731409 A | 7/2016 | |
| EP | 2 555 307 A1 | 2/2013 | |
| EP | 2 555 307 A8 | 2/2013 | |
| JP | 2014-93260 A | 5/2014 | |
| JP | 2014-93262 A | 5/2014 | |
| KR | 10-1155734 B1 | 6/2012 | |
| KR | 10-2013-0000227 A | 1/2013 | |
| KR | 10-1392689 B1 | 5/2014 | |
| KR | 10-2014-0116158 A | 10/2014 | |
| KR | 10-2015-0041079 A | 4/2015 | |
| WO | WO 2011/118801 A1 | 9/2011 | |
| WO | WO-2016126610 A1 * | 8/2016 | .......... H01M 2/1673 |

OTHER PUBLICATIONS

International Search Report issued in PCT/KR2017/000429 (PCT/ISA/210), dated May 4, 2017.
Sahu et al., "Air-stable, high-conduction solid electrolytes of arsenic-substituted $Li_4SnS_4$", Energy and Environmental Science, vol. 7, 2014, pp. 1053-1058.
European Search Report for Appl. No. 17738655.4 dated Jun. 11, 2018.
Lavela, P., et al, "Kinetic and thermodynamic aspects of lithium intercalation into lead tantalum sulfide and tin tantalum sulfide misfit layer compounds," Solid State Ionics, Feb. 1, 1995, vol. 76, No. 1-2, pp. 57-65.
Olivier-Fourcade, J., et al, "Lithium Ion Electrode Materials and the Properties of Atomic Orbitals," Journal of Solid State Chemistry, Oct. 1, 1999, vol. 147, No. 1, pp. 85-91.

* cited by examiner

【Figure 1】
【Figure 2】
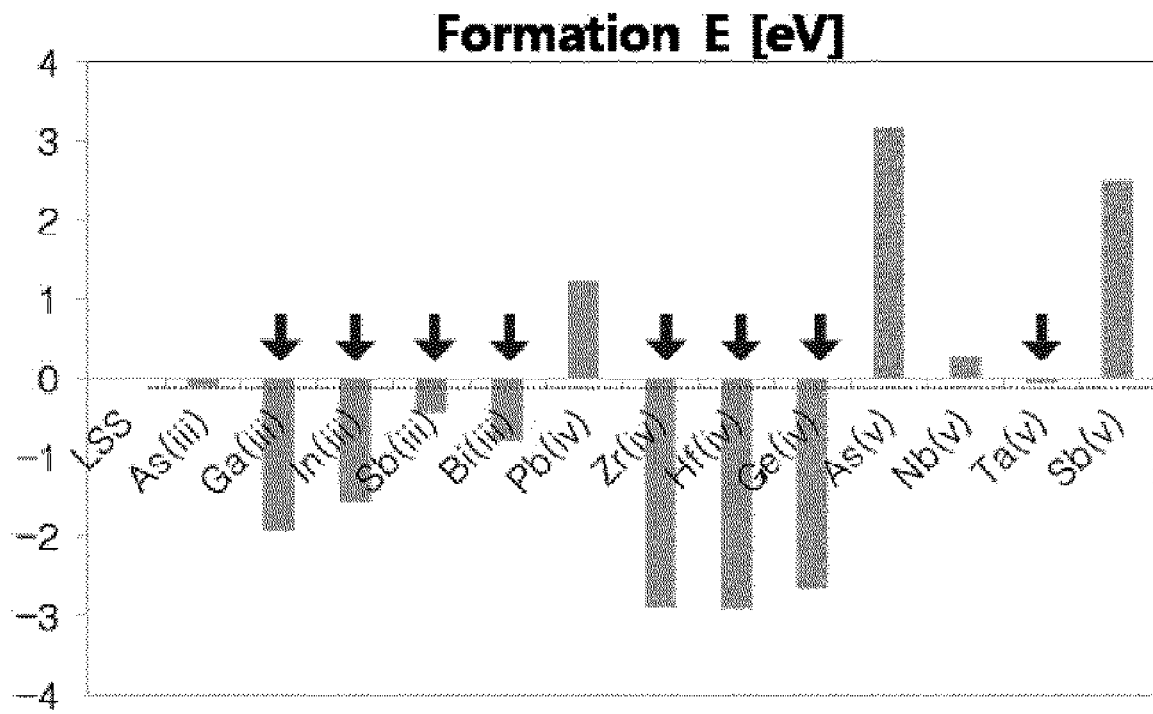

【Figure 3】
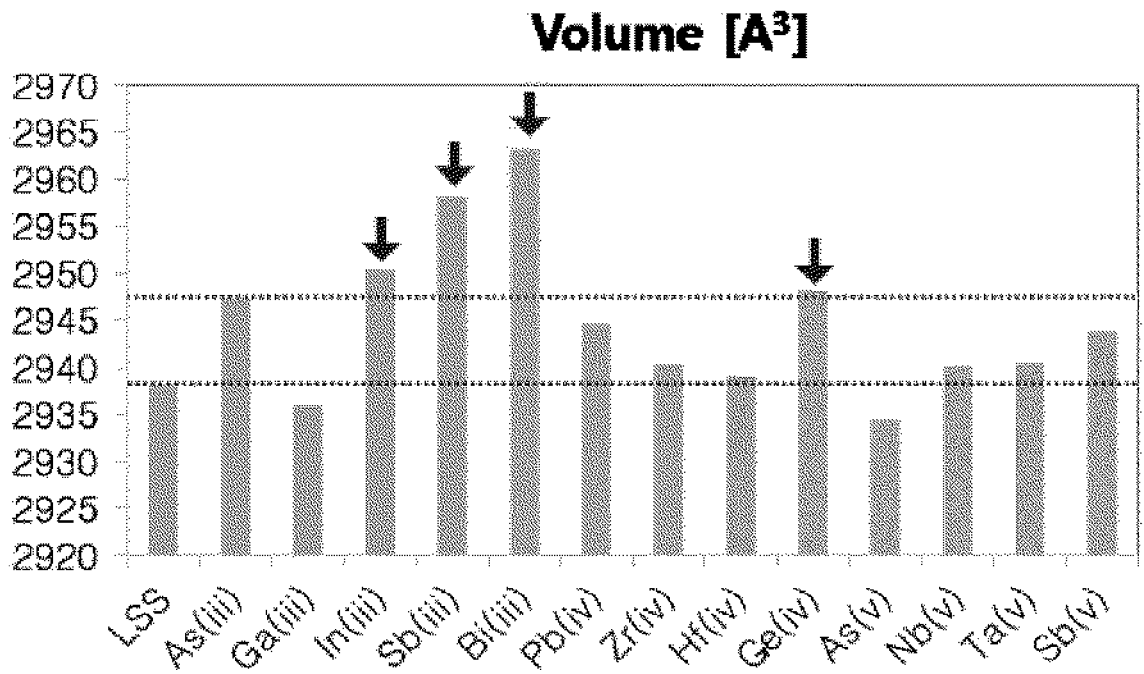
【Figure 4】
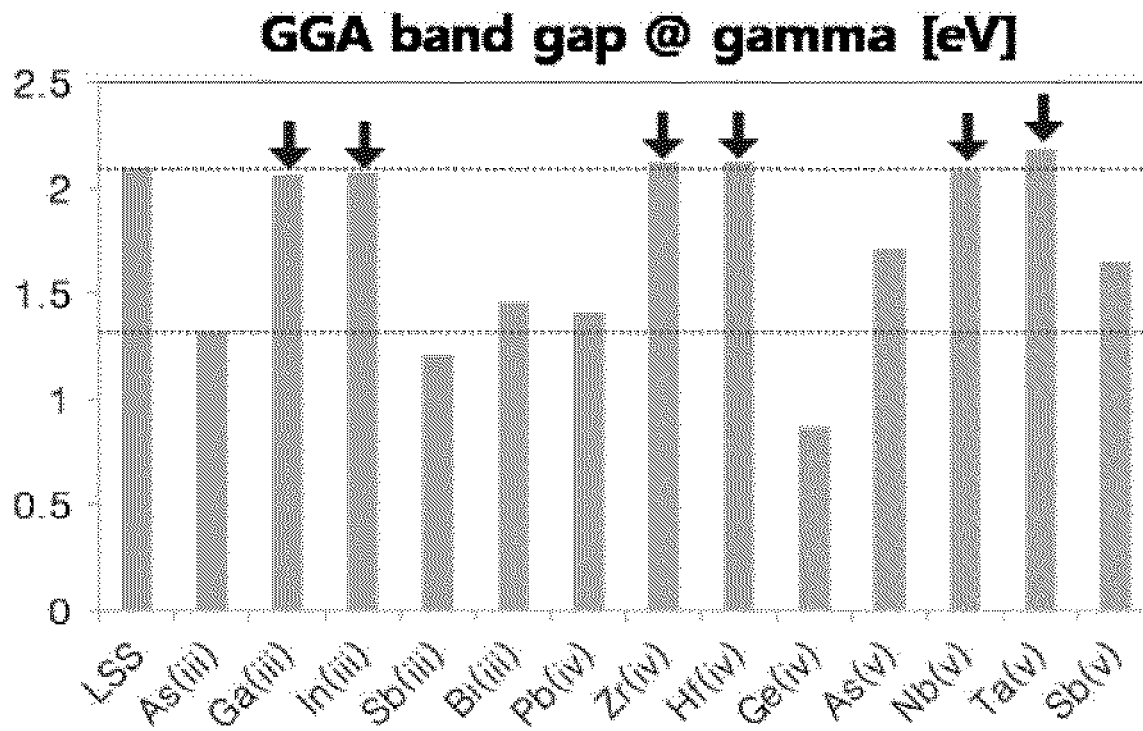

【Figure 5】
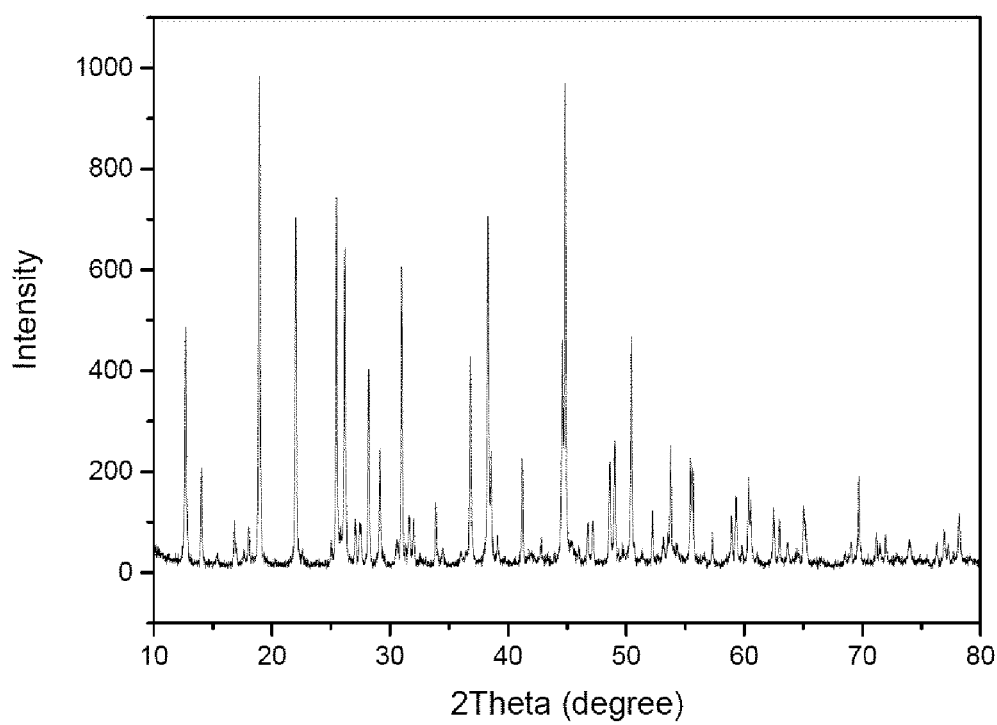

SULFIDE-BASED SOLID ELECTROLYTE AND ALL-SOLID-STATE BATTERY APPLIED THEREWITH

TECHNICAL FIELD

This application claims the benefits of priorities based on Korean Patent Application No. 10-2016-0003514, filed on Jan. 12, 2016 and Korean Patent Application No. 10-2017-0005605, filed on Jan. 12, 2017, the entire contents of which are incorporated herein by reference.

The present invention relates to a solid electrolyte containing a sulfide-based compound and an all-solid-state battery applied therewith.

BACKGROUND ART

From the viewpoints of battery capacity, safety, power output, enlargement, miniaturization, and the like, various batteries that can overcome the limitations of lithium secondary batteries are currently being studied.

Representatively, metal-air batteries, which have a theoretical capacity compared to lithium secondary batteries, in terms of capacity, all-solid-state batteries with no risk of explosion in terms of safety, supercapacitors in terms of output, NaS batteries or RFB (redox flow batteries) in terms of enlargement, thin film batteries in terms of miniaturization, etc., are continuous studied in academia and industry.

Among these, the all-solid-state battery is a battery in which a liquid electrolyte used in a conventional lithium secondary battery is replaced with a solid electrolyte, and the all-solid-state batteries can significantly improve safety since no flammable solvent is used in the battery and thus no ignition or explosion occurs due to the decomposition reaction of the conventional electrolyte solution. In addition, there is an advantage that since Li metal or Li alloy can be used as the material of the negative electrode, the energy density with respect to the mass and volume of the battery can be remarkably improved.

In particular, inorganic solid electrolytes among the solid electrolytes used in the all-solid-state batteries can be classified as sulfide-based electrolytes and oxide-based electrolytes. At present, the most advanced solid electrolytes are sulfide-based solid electrolytes, and the ion conductivity of such solid electrolytes has been developed to materials which have an ion conductivity close to that of the organic electrolyte solution.

However, it is typically known that the sulfide-based solid electrolyte contains phosphorus element (P) and reacts with moisture and oxygen in the atmosphere, resulting in rapid deterioration of performance. Accordingly, since the storage stability in the atmosphere is lowered, there is a difficulty in handling, and a toxic gas such as hydrogen sulfide ($H_2S$) is generated by reacting with water as shown in the following reaction scheme (1), thus there is a problem of safety and stability:

[reaction scheme 1]

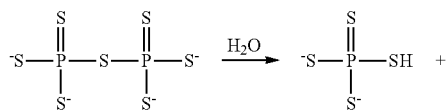

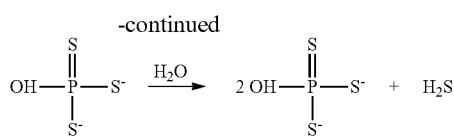

DISCLOSURE

Technical Problem

As described above, most sulfide-based solid electrolytes contain phosphorus element (P) and exhibit high ion conductivity of $10^{-3}$ to $10^{-5}$ S/cm, but have a problem of reacting with moisture in the atmosphere.

Therefore, an object of the present invention is to provide a sulfide-based solid electrolyte which is improved in safety and stability while maintaining a high ion conductivity by replacing phosphorus element (P) with another element.

Technical Solution

In order to achieve the above object, the present invention provides a sulfide-based solid electrolyte characterized by comprising a lithium-tin-metal-sulfide (LTMS) based compound represented by general formula 1 below:

$$Li_aSn_bM_cS_d \quad \text{[General formula 1]}$$

wherein M and a, b, c and d are as defined herein.

In addition, the present invention provides a preparation method of the sulfide-based solid electrolyte comprising, i) mixing lithium sulfide, tin sulfide and sulfide containing M (wherein M is at least one metal selected from elements (except for Sn) of Group 4, Group 5, Group 13, Group 14 and Group 15 among elements belonging to period 4 to 6 of a periodic table of the elements (IUPAC); and ii) heat-treating the mixture.

In addition, the present invention provides an all-solid-state battery comprising the sulfide-based solid electrolyte.

Advantageous Effects

According to the sulfide-based solid electrolyte and the all-solid-state battery applied therewith according to the present invention, the reactivity to moisture is improved, the generation of toxic gas such as hydrogen sulfide ($H_2S$) is prevented, the safety and stability are improved, and also the ion conductivity is not reduced even after being left in air, and the solid electrolyte is easy to handle and store due to the improved shelf stability thereof.

DESCRIPTION OF DRAWINGS

FIG. 1 is a periodic table indicating the elements (M) (except for Sn) available in the $Li_aSn_bM_cS_d$ of the present invention.

FIG. 2 is data obtained by comparing the formation energies of the respective elements (M) in the $Li_aSn_bM_cS_d$ of the present invention.

FIG. 3 is data obtained by comparing the lattice volumes of the respective elements (M) in the $Li_aSn_bM_cS_d$ of the present invention.

FIG. 4 is data obtained by comparing the band gap energies of the respective elements (M) in the $Li_aSn_bM_cS_d$ of the present invention.

FIG. 5 is a XRD result of $Li_{13}Sn_2InS_{12}$ prepared according to Example 1 of the present invention.

BEST MODE

Hereinafter, the present invention will be described in detail with reference to the accompanying drawings so that those skilled in the art can easily carry out the present invention. However, the present invention may be embodied in many different forms and is not limited thereto.

Lithium-tin-metal-sulfide based compound In general, the sulfide-based solid electrolyte used in the art is composed of Li—P—S or Li—P—X—S (where X is a metal element other than P) and thus contains phosphorus element (P). However, due to safety and stability issues such as generation of toxic gas by phosphorus element (P), the present invention is to provide a new lithium-tin-metal-sulfide (LTMS: Lithium-Tin-Metal-Sulfide), which necessarily contains lithium (Li) and sulfur (S) but does not contain a phosphorus element (P), as a solid electrolyte.

LTMS is a structure partially substituted by metal M in the basic crystal structure of lithium-tin-sulfide (LTS), and is preferably represented by general formula 1 below:

$$Li_aSn_bM_cS_d$$ [General formula 1]

wherein M is at least one metal selected from elements (except for Sn) of Group 4, Group 5, Group 13, Group 14 and Group 15 among elements belonging to period 4 to 6 of a periodic table of the elements (IUPAC), and 0<a≤20, 0<b≤5, 0<c≤5, and 0<d≤20.

The M described in the general formula 1 can be confirmed through the periodic table (IUPAC) of FIG. 1. More specifically, the element M may be at least one selected from the group consisting of transition metals such as zirconium (Zr), niobium (Nb), hafnium (Hf), and tantalum (Ta), post-transition metals such as gallium (Ga), indium (In), thallium (Tl), lead (Pb) and bismuth (Bi), metalloids such as germanium (Ge), arsenic (As), and antimony (Sb).

For example, these elements M have 3 to 5 valent electrons and thus may produce form (M-S) by chemically bonding to sulfur element (S), and this form (M-S) forms an anion and thus forms electrochemical bond (Li$^+$(M-S)$^-$) with metal cation such as lithium (Li). These compounds allow migration of lithium cations (Li$^+$).

In the present invention, the element M that replaces the phosphorus element (P) must be able to form a compound by synthesis with lithium (Li) and sulfur (S), and it is preferable that it is excellent in ion conductivity and is an electrical insulator, in order to be applied as the solid electrolyte for the all-solid-state battery. Accordingly, in order to confirm in the following experimental example whether the above conditions are satisfied through the virtual simulation, thirteen elements (AS(III), Ga(III), In(III), Sb(III), Bi(III), Pb(IV), Zr(IV), Hf(IV), Ge(IV), As(V), Nb(V), Ta(V), Sb(V)) capable of substituting Sn-site in Li$_4$SnS$_4$ having ion conductivity of 10$^{-5}$ S/cm at room temperature were selected and then simulations thereof were carried out for formation energy, lattice volume, and band gap energy, and these values were derived based on the density function theory (DFT (Density Function Theory), GGA-PBE).

Formation Energy

The simulations of the structural modeling of lithium-tin-metal-sulfide based compounds substituted with the above 13 candidate elements were performed, and calculation of formation enthalpy (ΔH) for each atom was performed. It can be said that the enthalpy (ΔH) at a temperature of 0 K and a pressure of 0 is the total energy in the optimized grid model. In the present invention, a standard generation enthalpy is used to determine relative values, but the present invention is not limited thereto.

Therefore, the formation energies of the compounds substituted with the above-mentioned 13 elements as the candidates for the solid electrolyte were simulated. The data resulted are shown in FIG. 2. As a result, element species with lower formation energies on the basis of Li$_4$SnS$_4$ (LSS), which is a compound before substitution, can substitute for Sn-site because they have more stable energy levels in the formation of compounds. Therefore, it will be said from calculative chemistry that when having a negative value on the basis of formation energy of Li$_4$SnS$_4$ (LSS), the element is an element that can be spontaneously substituted and synthesized well. It can be confirmed that the elements satisfying these conditions are Ga (III), In (III), Sb (III), Bi (III), Zr (IV), Hf (IV), Ge (IV) and Ta (V).

Lattice Volume

The transfer of ions in the solid phase takes place through a limited path in the lattice, unlike in liquids. In general, the ion conductivity of the solid electrolyte is lower than the ion conductivity of the liquid electrolyte. However, for some solids, ion conductivity has been reported to be higher than those in liquids in theory, and it is important to measure or predict the ion conductivity of the solid electrolyte for the all-solid-state secondary battery, since the ion conductivity of the electrolyte is an important element that determines the charge and discharge rate and output rate of the battery.

This ion transport mechanism in solid phase is a major factor of ionic point defects or lattice defects due to defects, and electrostatic attraction and repulsion. The ionic point defect can be divided into Schottky defect where vacancy is formed by cation/anion pair and Frenkel defect where vacancy is formed by a pair of interstitial atoms at different positions.

The Schottky defect is a state in which there is no atom that should originally exist in the crystal lattice point, and this atomic vacancy is called an attack point. This means that one of the atoms in the crystal is present on the surface of the crystal out of its original position. In addition, Frenkel defect is a defect caused by intercalation of another atom into the gap between the lattices of the atoms constituting the crystal lattice, that is, is a defect caused by intercalation of the atom exited from the Schottky defect between the lattice.

The lattice volume means a space of the lattice defect as described above in such a solid electrolyte, and such a space forms a three-dimensional channel between the crystal lattice, and ion conduction becomes possible by placing cations in such a channel.

As a result of substitution by each element, the entire skeletal structure is maintained, but the lattice volume is changed. The larger the lattice volume, the more channels that are more suitable for ion transport are formed, and thus ion conductivity is improved (H. Aono and E. Sugimoto, 'Electrical property and sinterability of LiTi$_2$ (PO$_4$)$_3$ mixed with lithium salt (Li$_3$PO$_4$ or Li$_3$BO$_3$)' Solid State Ionics, 47, 257 (1991)).

Therefore, the simulations for lattice volumes of the compounds substituted with the above 13 elements as a candidate for the solid electrolyte were performed, and the data resulted are shown in FIG. 3. In case of a compound with the higher lattice volume on the basis on the lattice volume of Li$_4$SnS$_4$ (LSS), i.e., the compound before substitution, since the activation energy tends to be low when Li ions are diffused, it can be said that ion conductivity is also high. Therefore, it can be expected that the ion conductivity will be greater than 10$^{-5}$S/cm of ion conductivity of Li$_4$SnS$_4$ (LSS). Among the above 13 kinds of elements, when substituted with 11 kinds of elements except for Ga (III) and As (V), it was exhibited that lattice volume is large. Particularly, when substituted with elements of In (III), Sb (III), Bi (III) or Ge (IV) among them, it can be expected to have high ion conductivity.

Band Gap Energy

The band gap, also called energy gap, means the energy level or energy difference between the highest energy level in which electrons are present and the lowest energy level in which no electrons are present. The band gap of an insulator or semiconductor usually refers to the energy difference between the highest part of a valence electron band and the lowest part of a conduction band and is expressed in electron volts (eV). This is the amount of energy that is needed to send the outer electrons around the nucleus in a free state, and it can be predicted that the larger the bandgap size, the better the insulation.

Therefore, the band gap energies for the compounds substituted by 13 elements as a candidate for the solid electrolyte were simulated and the data resulted are shown in FIG. 4. As the band gap becomes larger, it has excellent electrical insulation, can be stably used as a solid electrolyte, and has a wide working voltage range. Considering that the band gap of $Li_4SnS_4$ (LSS) is 2 eV, it can be considered that when substituted by an element having a bandgap higher than 2 eV, a stable compound can be generated. It was exhibited that the band gap when substituted with Ga (III), In (III), Zr (IV), Hf (IV), Nb (V) as the elements satisfying these conditions is similar to the reference value, i.e., the band gap of $Li_4SnS_4$ (LSS), and therefore, it is confirmed that it has insulation property and can be used as a solid electrolyte.

As a result of combining the formation energy, the lattice volume, and the band gap energy, it was exhibited that three elements of In (III), Zr (IV) and Ta (V) that satisfy all of formation energy below 0 eV, lattice volume above 2940 $A^3$, and band gap energy above 2 eV are excellent for all of composability, ion conductivity and electrical insulation properties. Therefore, it is confirmed that these elements are suitable for use as a substitute for the phosphorus element (P) in the sulfide-based solid electrolyte.

These lithium-tin-metal-sulfide based compounds can be prepared in an average particle size ranging from a few nanometers to thousands of microns. Additionally, with respect to the form, it is not particularly limited, but it is preferable that the average particle diameter is within the range of 0.1 to 50 μm.

A nanoscale particle size is easy to broaden the contact area with the usual active material, this can be a favorable condition for charging and discharging by enlarging the transmission path of lithium ion, and thus it is advantageous to have the nanoscale particle size.

Preparation Method of Lithium-Tin-Metal-Sulfide Based Compound

The preparation method of the lithium-tin-metal-sulfide based compound of the general formula 1 proposed in the present invention can be prepared based on the preparation method of the known lithium-tin-metal-sulfide based compound.

Typically, the lithium-tin-metal-sulfide based compound is prepared by a method comprising i) mixing lithium sulfide, tin sulfide and sulfide containing M; and ii) heat-treating the mixture.

Hereinafter, each step will be described in detail.

First, lithium sulfide, tin sulfide, and sulfide containing M, in the form of powder, are mixed to prepare mixed powder.

Lithium sulfide is not particularly limited in the present invention, and a known substance can be selected and used. Typically, $Li_2S$, $Li_2S_2$ and the like are possible, and preferably $Li_2S$ is used.

Tin sulfide is not particularly limited in the present invention, and a known material can be selected and used. Typically, $SnS_2$, $SnS$ and the like are possible, and preferably $SnS_2$ is used.

As the compound containing M, various materials can be used depending on the kind of M, and for example, $In_2S_3$, $ZrS_3$, $Ta_2S_3$, etc. can be used when M is In, Zr or Ta.

In this case, the content ratio of lithium sulfide, tin sulfide and sulfide containing M can be controlled in various ways depending on the molar ratio of the final lithium-tin-metal-sulfide based compound, and is not particularly limited in the present invention.

The mixing may be performed by a dry or wet mixing method, and is not particularly limited in the present invention.

The mixing is carried out by a method used for conventional mixed powder production, and mechanical milling can be performed for uniform particle mixing. For the mechanical milling, for example, a roll-mill, a ball-mill or a jet-mill may be used. The mixing can be carried out for from 1 hour to 8 hours, preferably from 1 hour to 6 hours Next, the mixed powder obtained in the above step is heat-treated to produce a lithium-tin-metal-sulfide based compound.

The heat treatment in this step is preferably carried out in a temperature range of 400 to 850° C. for about 1 to 60 minutes, specifically 1 to 30 minutes, more particularly 1 to 10 minutes.

The heat treatment may be performed at least once, and may be performed in two steps including the first heat treatment and the second heat treatment, and in this case, when performing the second heat treatment at higher temperature than that in the first heat treatment, it is advantageous for particle formation and production of lithium-tin-sulfide based compound.

In this case, if the temperature of the heat treatment is lower than the above range, the preparation itself of the lithium-tin-metal-sulfide based compound may become difficult. On the contrary, if the temperature of the heat treatment exceeds the above range, the particles of the lithium-metal-tin-sulfide based compound become larger, and thus ion conductivity may be lowered or there is a possibility that the production of particles of uniform size becomes difficult.

All-Solid-State Battery

The above-described lithium-tin-metal-sulfide based compound according to the present invention can be preferably used as a solid electrolyte for the all-solid-state battery.

The all-solid-state battery contains a positive electrode, a negative electrode, and a solid electrolyte interposed therebetween.

The lithium-tin-metal-sulfide based compound of the present invention has high ion conductivity and at the same time does not generate a toxic gas, so that it is possible to ensure physical properties equal to or higher than those of other conventional sulfide-based solid electrolytes.

The thickness of the solid electrolyte layer formed by the lithium-tin-metal-sulfide based compound is greatly different depending on the structure of the all-solid-state battery. However, for example, it is preferably 0.1 μm or more and 1 mm or less, and more preferably 1 μm or more and 100 μm or less. The solid electrolyte preferably has high lithium ion conductivity, and the lithium ion conductivity at room temperature is preferably $1 \times 10^{-4}$ S/cm or more, for example.

In this case, the solid electrolyte may further include a solid electrolyte commonly used in the all-solid-state battery in addition to the lithium-tin-metal-sulfide based compound. As an example, an inorganic solid electrolyte or an organic solid electrolyte may be used.

In the case of the inorganic solid electrolyte, a ceramic material, a crystalline material or an amorphous material may be used, and the inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (wherein w is w<1), and $Li_{3.6}Si_{0.6}P_{0.4}O_4$ can be used.

In addition, examples of the organic solid electrolyte include organic solid electrolytes prepared by mixing lithium salt to polymeric materials such as polyethylene derivatives, polyethylene oxide derivatives, polypropylene oxide derivatives, phosphate ester polymers, agitation lysine, polyester sulfide, polyvinyl alcohol, and polyvinylidene fluoride. In this case, these may be used alone or in combination of at least one.

Meanwhile, the positive electrode and the negative electrode for the all-solid-state battery according to the present invention are not particularly limited and known ones can be used.

The all-solid-state battery proposed in the present invention defines the constitution of the solid electrolyte as described above, and the other elements constituting the battery, that is, the positive electrode and the negative electrode, are not particularly limited in the present invention and follow the description below.

The negative electrode for the all-solid-state battery is a lithium metal alone, or negative electrode active material can be laminated on the negative electrode current collector.

In this case, the negative electrode current collector is not particularly limited as long as it is conductive without causing any chemical change in the all-solid-state battery, and for example, copper, stainless steel, aluminum, nickel, titanium, sintered carbon, copper or stainless steel whose surface is treated with carbon, nickel, titanium, silver or the like, or aluminum-cadmium alloy, etc. can be used, Additionally, as with the positive electrode current collector, the negative electrode current collector may include various forms such as a film, a sheet, a foil, a net, a porous body, a foam, and a nonwoven fabric having minute irregularities formed on their surfaces.

The negative electrode active material may be any one selected from the group consisting of lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide is lithium and an oxide ($MeO_x$) of any one metal (Me) selected from the group consisting of Si, Sn, Zn, Mg, Cd, Ce, Ni and Fe and for example, may be $LixFe_2O_3$ (0=x=1) or $LixWO_2$ (0<x=1).

In addition, the negative electrode active material may be metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen; 0<x=1; 1=y=3; 1=z=8); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon or carbon composite may be used alone or in combination of two or more The positive electrode for the all-solid-state battery according to the present invention is not particularly limited and may be a material used for a known all-solid-state battery.

The positive electrode current collector is not particularly limited as long as it has high conductivity without causing chemical change in the relevant battery, and for example, stainless steel, aluminum, nickel, titanium, sintered carbon, or aluminum or stainless steel whose surface is treated with carbon, nickel, titanium, silver or the like may be used.

The positive electrode active material can be varied depending on the use of the lithium secondary battery, and lithium metal oxides such $LiNi_{0.8-x}Co_{0.2}AlxO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$; chalcogenides such as $Cu_2Mo_6S_8$, FeS, CoS and NiS, and oxides, sulfides or halides of scandium, ruthenium, titanium, vanadium, molybdenum, chromium, manganese, iron, cobalt, nickel, copper, zinc may be used, and more specifically, $TiS_2$, $ZrS_2$, $RuO_2$, $Co_3O_4$, $Mo_6S_8$, $V_2O_5$ etc. may be used, but the present invention is not limited thereto.

The shape of the positive electrode active material is not particularly limited, and may be a particle shape, for example, a spherical shape, an elliptical shape, a rectangular shape, or the like. The average particle diameter of the positive electrode active material may be, but is not limited thereto, within the range of 1 to 50 μm. The average particle diameter of the positive electrode active material can be obtained, for example, by measuring the particle diameters of the active materials observed by a scanning electron microscope and calculating the average value thereof.

The binder contained in the positive electrode is not particularly limited, and fluorine-containing binders such as polyvinylidene fluoride (PVDF) and polytetrafluoroethylene (PTFE) can be used.

The content of the binder is not particularly limited as long as the positive electrode active material can be fixed thereby, and may be in the range of 0 to 10% by weight based on the entire positive electrode.

The positive electrode may additionally contain conductive materials. The conductive materials are not particularly limited as long as they can improve the conductivity of the positive electrode, and examples thereof may include nickel powder, cobalt oxide, titanium oxide, and carbon. Examples of the carbon may include any one or one or more selected from the group consisting of Ketjen black, acetylene black, furnace black, graphite, carbon fiber, and fullerene.

In this case, the content of the conductive materials may be selected in consideration of other conditions of batteries such as the type of the conductive materials, and for example, may be in the range of 1 to 10% by weight with respect to the entire positive electrode.

Preparation of an all-solid-state battery having the constitution as described above is not particularly limited in the present invention, but is possible through a known method.

As an example, the solid electrolyte is placed between the positive electrode and the negative electrode, followed by compression molding to assemble the cell.

The assembled cell is placed in a casing and sealed by heat compression or the like. Laminate packs made of aluminum, stainless steel, or the like, and cylindrical or square metal containers are very suitable as the exterior material.

The battery of the present invention includes the lithium-tin-metal-sulfide based solid electrolyte proposed in the present invention as a component, thereby having excellent charging and discharging characteristics. Although the all-solid-state batteries, which are composed only of solid, can prevent safety accidents such as explosion and thus are an ultimate battery form with excellent safety, the all-solid-state batteries are not yet widely used because they do not achieve high capacity and high power. The main reason for this is the material properties of the electrolyte.

By including the lithium-tin-metal-sulfide based compound proposed in the present invention as a component of a solid electrolyte, excellent battery characteristics can be ensured.

Hereinafter, preferred examples of the present invention and comparative examples are described. However, the following examples are only a preferred example of the present invention, and the present invention is not limited to the following examples.

Example 1: Synthesis of $Li_{13}Sn_2InS_{12}$

In order to synthesize $Li_{13}Sn_2InS_{12}$ according to the present invention, i.e., a $Li_{4-x}Sn_{1-x}M_xS_4$ compound in which M is In, $Li_2S$, $SnS_2$, and $In_2S_3$ were inductively mixed at a molar ratio of 5:2:1. In this case, $SnS_2$ was prepared by mixing Sn and S at a molar ratio of 1:2 and heat-treating at 400° C. A total of 5 g of the sample was sampled and a pellet was prepared by using CIP, and then the specimen was sealed in a quartz tube while keeping the vacuum, and sufficiently heat-treated at 600° C. for 20 hours or more to obtain $Li_{13}Sn_2InS_{12}$.

Experimental Example 1: XRD Results

The solid electrolyte prepared in Example 1 was subjected to X-ray diffraction analysis (XRD) to confirm its crystallinity. The results are shown in FIG. 5.

As shown in FIG. 5, it was confirmed that the solid electrolyte particles of Example 1 are similar to the crystal structure of $Li_4SnS_4$, and a part of the peak is shifted due to indium (In) substitution.

Therefore, the all-solid-state battery according to the present invention is safer and has a high energy density, and thus can be preferably applied as a substitute for renewable energy or a power source for an electric vehicle.

The invention claimed is:

1. A sulfide-based solid electrolyte characterized by comprising a lithium-tin-metal-sulfide (LTMS) based compound represented by $Li_{13}Sn_2InS_{12}$.

2. A preparation method for the sulfide-based solid electrolyte according to claim 1 characterized by comprising,
   i) mixing lithium sulfide, tin sulfide and sulfide containing M, wherein M is In; and
   ii) heat-treating the mixture.

3. The preparation method of the sulfide-based solid electrolyte according to claim 2, characterized in that the heat-treating is performed one or more times at 400 to 850° C.

4. The preparation method of the sulfide-based solid electrolyte according to claim 2, wherein the sulfide containing M wherein M is In is indium(III) sulfide.

5. The preparation method of the sulfide-based solid electrolyte according to claim 4, wherein lithium sulfide, tin sulfide and indium(III) sulfide are mixed at a molar ratio of 5:2:1.

6. An all-solid-state battery comprising a positive electrode (cathode); a negative electrode (anode); and a solid electrolyte interposed therebetween, characterized in that the sulfide-based solid electrolyte is the sulfide-based solid electrolyte according to claim 1.

* * * * *